March 21, 1961   R. J. DIXON ET AL   2,975,440
FEED MECHANISMS FOR SCREW THREAD-FORMING ATTACHMENTS
FOR METAL-WORKING POWER-DRIVEN LATHES
Filed March 19, 1959
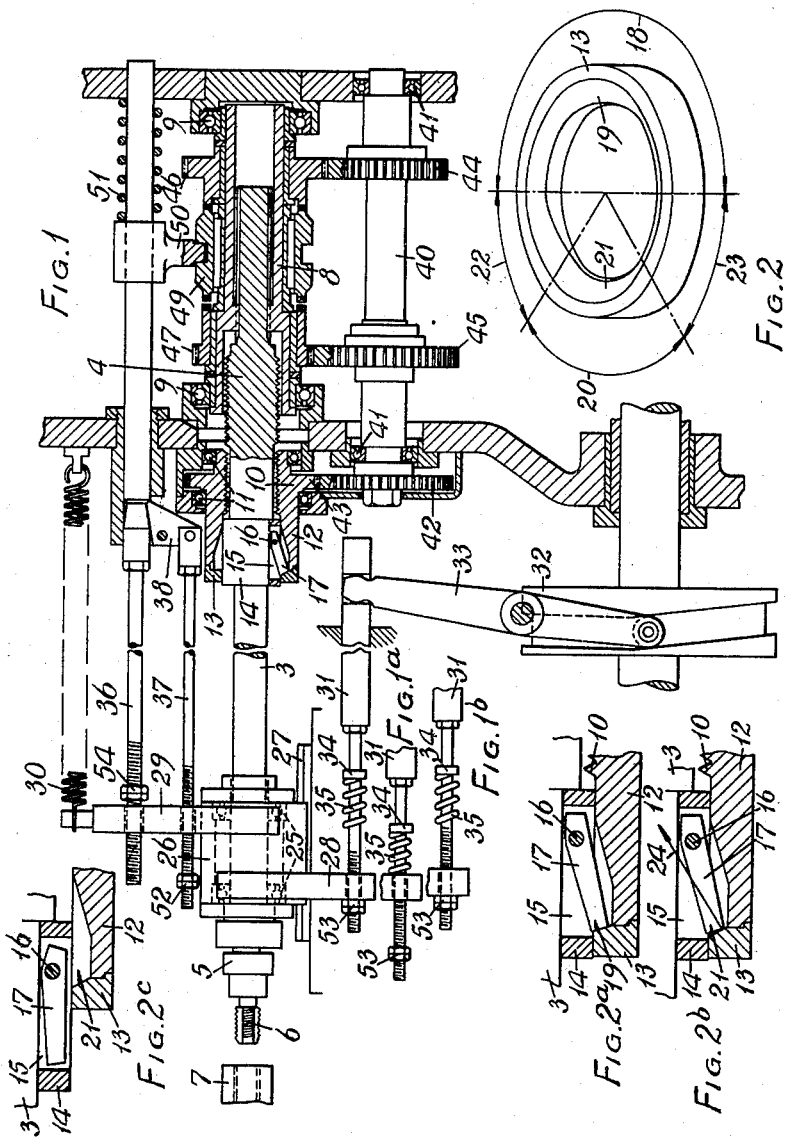
Inventors
R. J. Dixon
L. Jones

2,975,440

FEED MECHANISMS FOR SCREW THREAD-FORMING ATTACHMENTS FOR METAL-WORKING POWER-DRIVEN LATHES

Reginald John Dixon, Solihull, and Lewis Jones, Coventry, England, assignors to Wickman Limited, Warwickshire, England Filed Mar. 19, 1959, Ser. No. 800,583

Claims priority, application Great Britain Mar. 25, 1958

4 Claims. (Cl. 10—139)

This invention relates to feed mechanisms for screw thread-forming attachments for metal-working power-driven lathes, which mechanisms are of the type comprising a rotary nut, and a rotary and axially movable tap-carrying spindle having thereon a screw engageable with the nut, the axial movements of the spindle being effected by rotating it at different speeds relatively to the nut so that the spindle is fed or retracted in a controlled manner by its engagement with the nut.

Hitherto the spindle has been engaged under spring or like yielding pressure with the nut in each feed movement of the spindle, and sometimes injury to the ends of the helical threads of the screw and nut has resulted when they are brought into mutual engagement.

The object of the present invention is to enable the screw to be engaged under spring or like yielding pressure with the nut in each feed movement of the spindle with a minimum risk of the aforesaid injury.

The invention comprises a feed mechanism of the type aforesaid which includes a pivoted latch in combination with the spindle, springs or like yielding means adapted to impart short axial movements to the spindle for effecting engagement and disengagement of the screw and nut, and an annular abutment in combination with the nut for engagement by the latch, the abutment being adapted by engagement of the latch therewith to prevent axial movement of the spindle until the nut and screw are in the correct position for mutual engagement and thereupon to effect disengagement of the latch to enable one of the springs to move the screw into engagement with the nut.

In the accompanying drawings:

Figure 1 is a diagrammatic representation of a feed mechanism which includes the device forming the subject of the invention.

Figures 1a and 1b are fragmentary views illustrating different positions of a cam-operated rod forming a portion of the mechanisms shown in Figure 1.

Figure 2 is a perspective view of the annular abutment associated with the nut of the mechanism.

Figures 2a, 2b and 2c are fragmentary views illustrating the interaction of the latch and abutment.

Referring to Figure 1, the spindle 3 on which the feed screw 4 is formed or secured, is provided at one end with a chuck 5 for attachment thereto of a screw threaded tap 6 for forming a screw thread on the surface of a bore in a hollow work piece 7 which is rotated at the same speed and in the same direction as the nut to be hereinafter mentioned.

The end of the spindle 3 adjacent to the screw has a splined connection with a rotary sleeve 8 which can be rotated at either of two speeds by a driving mechanism to be hereinafter described, this sleeve being supported in the housing of the driving mechanism by bearings 9.

The rotary nut 10 is supported by bearings 11 and has formed on it a hollow cylindrical extension 12 to the forward end of which is secured an annular abutment 13. The said extension is adapted to accommodate a collar 14 on the spindle 3, and in the collar is formed a slot 15. Within this slot is pivoted at 16 one end of a latch 17 the free end of which can by centrifugal force or a spring be moved into engagement with the annular abutment 13 as shown in Figures 1 and 2a for preventing axial movement of the spindle. The abutment is also such that the collar 14 can pass through it when the latch is disengaged from the abutment. The inner periphery of the abutment is bevelled. In the portion of the abutment indicated by 18 in Figure 2, which subtends 180°, the inclination of the beveled part 19 is as shown in Figure 2a. In the part marked 20 which subtends an angle of 90°, the inclination of the part 21 is as shown in Figure 2b. In the portions of the inner periphery corresponding to the parts marked 22, 23 each of which subtends 45°, the bevel is shaped to merge gradually from the inclination shown in Figure 2a to that shown in Figure 2b.

The part marked 21 is such that it forms a concave or cam-like recess in the inner periphery of the abutment, and the angular position of the abutment on the nut extension 12 is so adjusted that the said part 21 coincides with the position at which one end of the screw thread of the screw 4 can engage the adjacent end of the screw thread of the nut 10.

The interaction of the latch and abutment is such that when the latch is in the position shown in Figure 2a, the line of endwise pressure between the latch and abutment passes through the axis of the pivot 16, and in this position the latch prevents axial movement of the spindle. When the latch is in the position shown in Figure 2b, the said line of pressure is directed as indicated by the line 24 to one side of the pivot axis, so setting up a couple which causes the latch to be returned to the slot 15, and thereby enabling the collar 14 and latch to pass through the abutment as shown in Figure 2c.

The forward end of the spindle 3 is supported by bearings 25 in a slide 26 which is movable on a guide 27. On the slide are formed or secured two tappets 28, 29, the tappet 29 being connected to a fixed part of the machine by a tension spring 30. In the tappet 28 is formed a hole through which passes a rod 31 which is movable in the longitudinal direction by a cam 32 acting on a lever 33. On the rod is formed a collar 34 which serves as an abutment for a spring 35, the purpose of the spring being to impart a short movement to the slide when the latch 17 is released from the annular abutment 13.

In the tappet 29 are formed two holes through which pass a clutch actuating rod 36, and a rod 37 which actuates a pivoted catch 38, the latter serving to lock the rod 36 and being loaded by a spring (not shown).

The mechanism for imparting rotary motion to the spindle 3 and nut 10, consists, in the example illustrated by the drawing, of a shaft 40 which is driven by any convenient source of motion, this shaft being supported by bearings 41. On the shaft is secured a gear wheel 42 which engages a gear wheel 43 of equal diameter on the nut 10. Also on the shaft 40 are secured two gear wheels 44, 45 which respectively engages wheels 46, 47 supported on the sleeve 8, the wheels 44, 46 being adapted to rotate the sleeve at a lower speed than the nut for effecting axial movement of the spindle 3 at the appropriate feed rate, and the wheels 45, 47 being adapted to rotate the sleeve at a higher speed than the nut for retracting the spindle, it being understood that the screw has a right-hand thread and the nut and work piece are driven in a clockwise direction as viewed from the right hand end of the drawing. On the sleeve 8 is mounted a slidable clutch member 49 which is rotated by the sleeve and can engage either of the wheels 46, 47 with the sleeve, the clutch member being actuated by a claw 50 on the rod 36 above mentioned, the said rod being movable in one direction by the tappet 29 and in the opposite direction by a spring 51.

Starting with the mechanism in the condition shown in Figure 1, the mode of action in each cycle of action is as follows:

The first effect of the cam 32 (which makes one revolution in each cycle of action of the mechanism) is to cause the lever 33 to move the rod 31 to the left and thereby cause the spring 35 to be compressed in contact with the tappet 28. When the cam-like part 21 of the annular abutment 13 disengages the latch 17 from the abutment, as shown in Figure 2c, the spring 35 causes the slide 26 to move to the left and so enable the screw 4 to engage the nut 10. The interaction of the nut and screw then moves the slide to its operative position where the tool 6 engages the work piece 7 and then performs the desired operation on the work piece. At the completion of this operation the tappet 29 strikes against a collar formed by the adjustable nuts 52 on the rod 37, causing the latter to move the catch 38 out of engagement with the rod 36, so allowing the spring 51 to move the clutch member 49 into engagement with the wheel 47. The driving mechanism then returns the spindle 3 towards its initial position, and when the screw 4 passes out of engagement with the nut 10, the spring 30, by its action on the slide 26, causes the adjacent ends of the nut and screw to be separated as shown in Figure 1, in readiness for the next cycle of action. Also the cam 32 causes the lever 33 to impart to the rod 31 a short additional movement to the right as shown in Figure 1b. In this movement a collar formed by adjustable nuts 53 on the rod 31 moves the slide to a corresponding extent, so causing the tappet 29 to move the rod 36 to the right for engaging the clutch member 49 with the wheel 46. This movement of the rod 36 is effected by the action of the tappet 29 on a collar formed by adjustable nuts 54 on the rod 36, and the rod 36 is then re-engaged by the catch 38 under the action of the spring associated with the catch. Finally, on reaching or approaching the completion of its rotation the cam 32 causes the lever 33 to return the rod 31 to its starting position as shown in Figure 1 in readiness for the next cycle of action. Meanwhile the work piece which has been acted on is removed and replaced by another work piece and the cycle of action above described is then repeated.

The essential features of the invention are associated with the latch 17, annular abutment 13, and the springs 35 and 30 for effecting initial engagement of the screw and nut and their eventual disengagement. The clutch controlled driving gear for the screw and nut and the means for actuating the clutch may be varied to meet different requirements.

Having thus described our invention what we claim as new and desire to secure by Letters Patent is:

1. A feed-mechanism for a screw thread-forming attachment for a metal-working power-driven lathe, comprising in combination a rotary but axially immovable nut, a rotary and axially movable tap-carrying spindle arranged co-axially with the nut and provided with a screw which is engageable with and disengageable from the nut in response to short axial movements of the spindle, driving means having parts connected to the spindle and nut for rotating them at different speeds and thereby causing the spindle to be moved axially when the screw is in engagement with the nut, yieldable means arranged to act on the spindle for imparting the said short axial movements thereto, a pivoted latch carried by the spindle, and an annular abutment carried by the nut and having differently shaped parts one of which serves by contact with the latch to prevent axial feed movement of the spindle until the screw and nut are in appropriate relative positions for mutual engagement, and another of which serves by contact with the latch to effect disengagement of the latter from the abutment when the screw and nut occupy the said relative positions, and thereby enable the yieldable means to impart axial movement to the spindle for effecting interengagement and disengagement of the screw and nut.

2. A feed mechanism according to claim 1 and comprising in combination a collar provided on the spindle and having a slot in which the latch is pivoted, a hollow extension which is provided on one end of the nut and accommodates the collar on the spindle, and which carries the annular abutment at the end remote from the nut, the annular abutment being capable of angular adjustment relative to the nut, and having differently shaped inner peripheral portions constituting the parts for co-operating with the latch, a slide supporting one end of the spindle, and springs arranged to act on the slide and constituting the yieldable means for imparting short axial movements to the spindle.

3. A feed mechanism according to claim 1, in which the inner periphery of the annular abutment has bevelled portions of different inclinations over different parts of its length, the portion of greater inclination forming a cam-like surface which serves by contact with the latch to effect disengagement thereof from the abutment when screw and nut are in appropriate positions for mutual engagement.

4. A feed mechanism according to claim 1 and comprising in combination a collar provided on the spindle and having a slot in which the latch is pivoted, a hollow extension which is provided on one end of the nut and accommodates the collar on the spindle, and which carries the annular abutment at the end remote from the nut, the annular abutment being capable of angular adjustment relative to the nut, and having differently shaped inner peripheral portions constituting the parts for co-operating with the latch, a slide supporting one end of the spindle, springs arranged to act on the slide and constituting the yieldable means for imparting short axial movements to the spindle, and means, including a member connected to and movable by the slide, for automatically controlling the action of the driving means.

References Cited in the file of this patent
UNITED STATES PATENTS

| | | |
|---|---|---|
| 1,398,731 | Lloyd | Nov. 29, 1921 |
| 2,796,767 | Carpenter | June 25, 1957 |